United States Patent [19]
Tsutsumi et al.

[11] 3,876,272
[45] Apr. 8, 1975

[54] CURRENT CONDUCTING DEVICE IN STEERING APPARATUS

[75] Inventors: Masanobu Tsutsumi; Kiyoshi Hanai, both of Toyota, Japan

[73] Assignee: Toyota Jidosha Kogyo Kabushiki Kaisha, Toyota-shi, Aichi-Ken, Japan

[22] Filed: Feb. 11, 1974

[21] Appl. No.: 441,346

[30] Foreign Application Priority Data
June 29, 1973  Japan................................ 48-73915

[52] U.S. Cl............. 339/3 S; 280/150 AB; 339/5 R
[51] Int. Cl.............................................. H01r 39/00
[58] Field of Search................ 339/35, 3 R, 5 R, 10; 280/87 R, 150 AB

[56] References Cited
UNITED STATES PATENTS

| | | | |
|---|---|---|---|
| 2,850,715 | 9/1958 | Gurney............................ | 339/3 S X |
| 3,525,536 | 8/1970 | Pruneski............................ | 339/3 S |
| 3,768,824 | 10/1973 | Kloppe et al............. | 280/150 AB X |

Primary Examiner—Roy Lake
Assistant Examiner—DeWalden W. Jones
Attorney, Agent, or Firm—Stevens, Davis, Miller & Mosher

[57]  ABSTRACT

In steering apparatus wherein a steering wheel is equipped with a gas bag, a current conducting device comprises a bearing whose inner race is secured to a steering main shaft through an insulator, whose outer race is secured to a steering column through an insulator and in which an electrically conductive lubricant is hermetically sealed. A cord led out from the inner race is connected through a connector to a gas generator inside a gas bag box, while a cord led out from the inner race is connected to a power source. The inner race, the outer race and bearing balls are held in close contact by a pressure applying mechanism. Irrespective of the turning position of the steering wheel, current can be conducted under an identical resistance, so that the steering apparatus is reliably operated.

8 Claims, 2 Drawing Figures

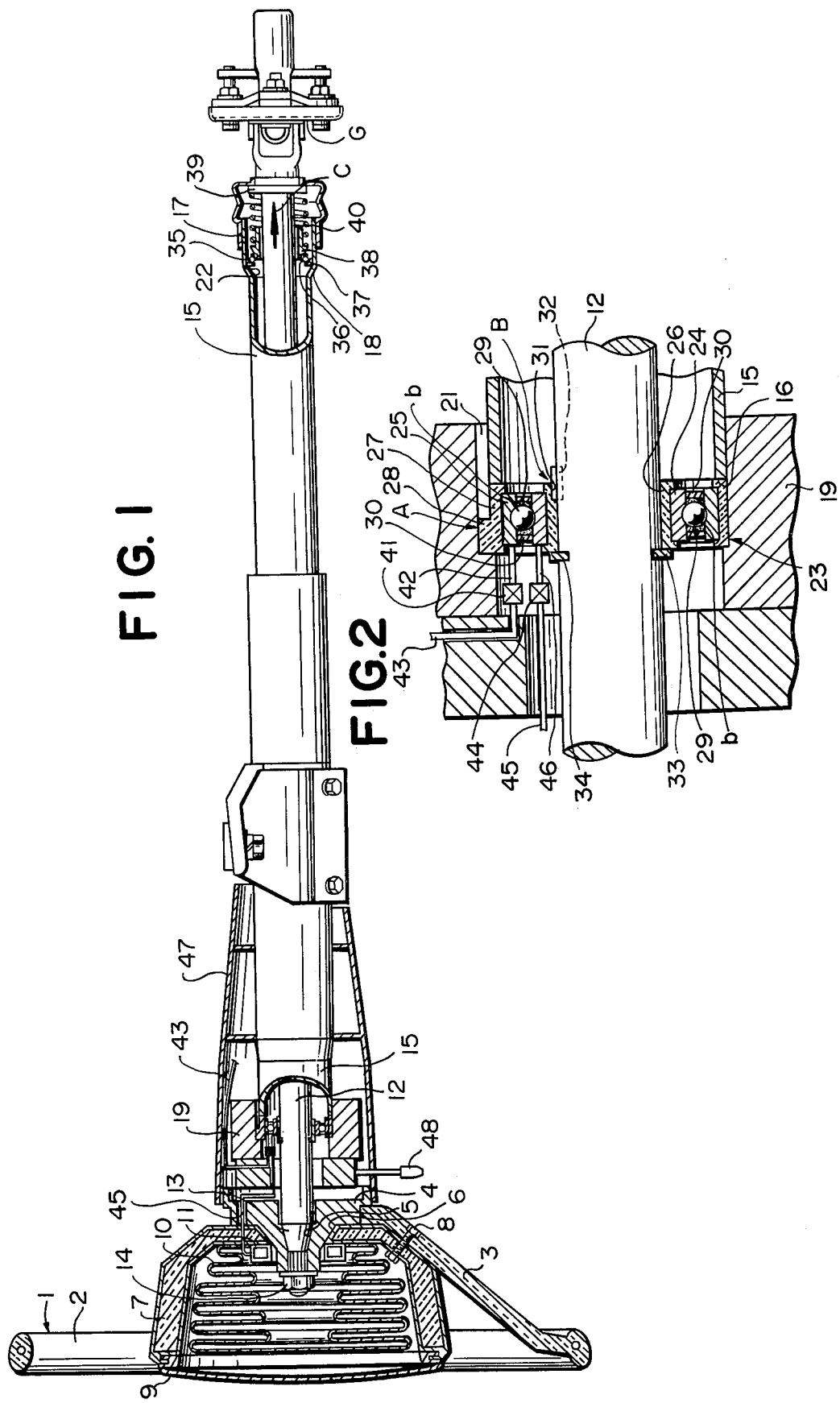

CURRENT CONDUCTING DEVICE IN STEERING APPARATUS

The present invention relates to a current conducting device in steering apparatus.

In prior-art steering apparatus, current is conducted to an electric equipment or appliance on the steering wheel side in such way that a turning contact segment mounted on the steering wheel side is brought into contact with the upper surface of a ring-shaped fixed contact plate mounted on the combination switch side. With this measure, a dispersion arises in the state of assembling in dependence on the extent of finishing as well as the degree of smoothness of the upper surface of the fixed contact plate and the degree of parallelism between the upper surface of the fixed contact plate and the turning locus of the turning contact segment to be contacted therewith, or in dependence on the precisions of finishing of the various members. An inferior contact is therefore caused at some positions of turning angles of the steering wheel after the initial abrasion of the turning contact segment. As a result, the contact resistance undergoes a change, and the extent of voltage drop changes. For such reason, it is sometimes the case that a gas bag equipped in the steering wheel cannot be instantly inflated in emergency.

An object of the present invention is to provide a current conducting device in steering apparatus wherein currents of several milliamperes to several ampers can be conducted always under an identical resistance irrespective of the turning position of a steering wheel.

Another object of the present invention is to provide a current conducting device in steering apparatus wherein at the turning operation of a steering wheel, current conducting cords can integrally turn without being disconnected due to twisting, bending or winding round a steering main shaft, and any trouble, such as inferior contact, as in the prior-art apparatus does not occur, so that the voltage drop can be made always constant.

These and other objects and advantages of the invention may be readily ascertained by referring to the following description and appended drawings in which:

FIG. 1 is a sectional side elevation showing an embodiment of the present invention, while FIG. 2 is a sectional side elevation showing the essential portions of the embodiment to enlarged scale.

In the illustrated embodiment, a steering wheel 1 is composed of a rim 2, a spoke 3 integral with the rim 2, a supporter 4 integrally coupled with the spoke 3, a gas bag box 7 secured to the spoke 3 by a bolt 8, and a wheel pad 9 detachably mounted on the gas bag box 7.

In the steering wheel 1, a taper portion 13 formed at an upper part of a steering main shaft 12 is fitted in a taper receiving surface 5 provided in the supporter 4 about its axis. Under this state, the supporter 4 and the steering main shaft 12 are integrally secured by a nut 14.

At some spacing from the lower surface 6 of the supporter 4, a steering column 15 which is a non-rotary member is opposed to the supporter 4. On the outer periphery of the upper end part of the steering column 15, there is integrally and fittedly secured the lower end part side of the inner periphery 20 of a steering upper bracket 19 which is shaped into a hollow cylinder.

Reference numeral 23 designates a bearing which has the property of conducting electric current. The bearing 23 includes an inner race 24 and an outer race 25. An inner race insulator 26 and an outer race insulator 27 molded of an electric insulating material such as synthetic resin are integrally and fittedly arranged on the inner periphery of the inner race 24 and the outer periphery of the outer race 25, respectively.

At a predetermined position of the outer periphery of the outer race insulator 27, a projecting piece 28 of suitable width is integrally formed.

In the space between the outer periphery of the inner race 24 and the inner periphery of the outer race 25 as oppose to each other, there is sealed a lubricant 29 being electrically conductive which is, for example, grease. The lubricant 29 is hermetically sealed by seal plates 30 which are held between the inner and outer races 24 and 25.

The bearing 23 of the foregoing construction is secured under the state under which it is held among the three surfaces of the upper end face 16 of the steering column 15, the inner periphery 20 of the steering upper bracket 19 disposed in the manner to be integral with the upper part of the steering column 15, and the peripheral surface of the steering main shaft 12.

The projecting piece 28 formed at the outer periphery of the outer race insulator 27 of the bearing 23 is fittedly arranged within a groove portion 21 formed at the inner periphery 20 of the steering upper bracket 19.

The groove portion 21 and the projecting piece 28 fitted therein constitute the first stopper mechanism (A) for integrally fixing the outer race 25, the steering column 15 being the nonrotary member, and the steering upper bracket 19.

At a predetermined position of the inner periphery of the inner race insulator 26 of the bearing 23, a groove portion 31 is formed. Fitted in the groove portion 31 is a stopper piece 32 which is integrally secured onto the steering main shaft 12. The engagement between the stopper piece 32 and the groove portion 31 forms the second stopper mechanism (B), by which the main shaft 12 and the inner race 24 are integrally turned.

The bearing 23 provided with the first and second stopper mechanisms (A) and (B) supports the upper end face of the inner race insulator 26 by means of a snap ring 34 which is engaged in a groove portion 33 formed along the whole periphery of the steering shaft 12. Thus, the bearing is prevented from coming off.

Reference numeral 35 indicates a sectional type thrust bearing. The lower end part of the steering column 15 is made an enlarged-diameter tube 17, and a step portion 18 is formed. The thrust bearing 35 is disposed on the inner peripheral wall 22 of the step portion 18. On the underside of the bearing 35, there are provided a sliding tube 38 which is slidably disposed on the steering main shaft 12 and a receiving seat 39 which is integrally secured to the steering main shaft 12. Between the sliding tube 38 and the receiving seat 39, a coiled spring 40 is disposed in the contracted state. Owing to the elastic force of the coiled spring 40, the sliding tube 38 is resiliently contacted with an inner race 36 of the bearing 35 as is disposed on the upper face thereof.

For this reason, the elastic force of the coiled spring 40 acts to press down the steering main shaft 12 in the direction of an arrow (C) through the medium of the steering column 15 which has the step portion 18 lying in contact with an outer race 37 of the bearing 35. Under the action, a thrust load is exerted between the inner race 24 and the outer race 25 of the bearing 23, and the races 24, 25 and balls (b) have pressures applied therebetween and are closely secured. The thrust load is of such extent that the pressures are 10 kg or greater.

Shown at (G) is a rubber coupling which is disposed on a universal joint attached to the lower end part of the steering main shaft 12. The rubber coupling (G) has such room that the pressure application to the bearing 23 can be effected by the depressing force bestowed on the steering main shaft 12 in the direction of the arrow (C).

Reference numeral 41 denotes the first connector which serves to connect a cord 42 led out from the upper face of the outer race 25 of the bearing 23 and a cord 43 connected to a power source.

Reference numeral 44 denotes the second connector which serves to connect a cord 45 connected to an electric equipment and a cord 46 led out from the upper face of the inner race 24 of the bearing 23. The electric equipment includes a gas generator 11 which is disposed on the upper surface of the bottom of the gas bag box 7.

Numeral 47 indicates a column cover, while numeral 48 represents a changeover controlling lever incorporated into the circuit of each actuating member. The lever 48 is arranged in a manner to protrude beyond the outer periphery of the column cover 47.

Detailed description will now be made of the operations of the various members in the running of a car equipped with the steering device of the present invention.

The bearing 23 which has the property of conducting electric current and which is supported in the fixed state by the surfaces of the steering main shaft 12 being the rotary body and the steering column 15 as well as the steering upper bracket 19 being the non-rotary body, has its inner race 24 turned integrally with the steering main shaft 12 by turning the steering wheel 1 in a certain direction and by the actions of the first stopper mechanism (A) and the second stopper mechanism (B). At this time, the cords 45 and 46 led out from the upper face of the inner race 24 are turned integrally with the main shaft 12 and the inner race 24. They are turned without twisting, bending or winding round the steering main shaft 12.

As previously stated, the electrically conductive lubricant 29 is hermetically sealed within the bearing 23, and besides, the three of the outer race 25, inner race 24 and bearing balls (b) are closely secured by the pressure application. On the basis of these facts, the circuit on the side of the first connector 41 and the circuit on the side of the second connector 44 are connected so that an electric current can be always conducted under an identical resistance. Thus, a minute current of several milliamperes for check and a current of several amperes for actuation can appropriately be reliably and readily supplied to the electric equipment including the gas generator 11 etc. disposed inside the gas bag box 7.

An igniter, not shown, is arranged in the gas generator 11. A suitable member such as neon lamp is disposed for the igniter in order to check the presence of disconnection. In emergency, the igniter ignites the gas generator, to instantly inflate a gas bag 10 which is received within the gas bag box 7 in the folded state.

By connecting the cord 45 to a steering horn switch, it becomes possible to conduct an always constant current. Therefore, the phenomenon in which a horn does not toot on account of an inferior contact or the like can be prevented very simply.

What is claimed is:

1. A current conducting device in steering apparatus, comprising:
    a bearing in which an electrically conductive lubricant is hermetically sealed;
    a main shaft being a rotary member to which an inner race of said bearing is secured through an inner race insulator molded of an electrically insulating material;
    a steering column to which an outer race of said bearing is fittedly secured through an outer race insulator molded of an electrically insulating material;
    a steering upper bracket which is disposed in a manner to be integrally secured to an upper part of said steering column;
    a power source to which said outer race is connected; and
    an electric equipment which is located on the steering wheel side and to which said inner race is connected;
    said bearing being subject to pressure application through said main shaft.

2. The current conducting device in steering apparatus according to claim 1, wherein the connection between said outer race and said power source and the connection between said inner race and said electric equipment are made by current conducting cords, respectively.

3. The current conducting device in steering apparatus according to claim 1, wherein said outer race of said bearing, said steering column and said steering upper bracket are integrally fixed by means of a projecting piece which is formed at the outer periphery of said outer race insulator and a groove portion which is formed at the inner periphery of said steering upper bracket and in which said projecting piece is fittedly arranged.

4. The current conducting device in steering apparatus according to claim 1, wherein said main shaft and said inner race are integrally turned by means of a groove portion which is formed at a predetermined position of the inner periphery of said inner race insulator and a stopper piece which is fitted in said groove portion and integrally secured onto said main shaft.

5. The current conducting device in steering apparatus according to claim 1, wherein an upper face part of said inner race insulator is supported by means of a groove portion formed along said steering shaft and a snap ring engaged in said groove portion, whereby said bearing is prevented from coming off.

6. The current conducting device in steering apparatus according to claim 1, wherein a lower end part of said steering column comprises an enlarged-diameter tube which has a step portion, a thrust bearing of the sectional type which is disposed on an inner peripheral wall of said step portion, a sliding tube which is disposed on the underside of said thrust bearing in a manner to be slidable on said steering main shaft, a receiving seat which is integrally secured to said steering main shaft, and a coiled spring which is disposed between said sliding tube and said receiving seat in a contracted state, said sliding tube being resiliently contacted with said inner race of said bearing by an elastic force of said coiled spring.

7. The current conducting device in steering apparatus according to claim 6, wherein said elastic force of said coiled spring acts to press said steering main shaft downwards through said steering column which has said step portion lying in contact with an outer race of said thrust bearing.

8. The current conducting device in steering apparatus according to claim 1, wherein the applied pressure is given to the amount of at least 10 kg by a thrust load.

* * * * *